US012644411B2

(12) United States Patent
Chukrallah et al.

(10) Patent No.: US 12,644,411 B2
(45) Date of Patent: Jun. 2, 2026

(54) ELECTRONICALLY DRIVEN LUBRICATION SYSTEM ON GAS TURBINE ENGINES

(71) Applicant: RTX Corporation, Farmington, CT (US)

(72) Inventors: Sami Chukrallah, West Palm Beach, FL (US); Andre M. Ajami, Henderson, NV (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/376,125

(22) Filed: Oct. 3, 2023

(65) Prior Publication Data

US 2025/0109709 A1      Apr. 3, 2025

(51) Int. Cl.
*F02C 7/06* (2006.01)
*F02C 7/14* (2006.01)
*F16N 29/00* (2006.01)

(52) U.S. Cl.
CPC .................. *F02C 7/06* (2013.01); *F02C 7/14* (2013.01); *F16N 29/00* (2013.01); *F05D 2220/323* (2013.01); *F05D 2260/98* (2013.01); *F16N 2210/02* (2013.01); *F16N 2270/20* (2013.01); *F16N 2270/72* (2013.01)

(58) Field of Classification Search
CPC ........ F02C 7/06; F16N 29/00; F05D 2260/98; F05D 2220/323
See application file for complete search history.

(56) References Cited

U.S. PATENT DOCUMENTS

| | | | |
|---|---|---|---|
| 7,506,724 B2 * | 3/2009 | Delaloye | F01D 25/18 |
| | | | 184/6.4 |
| 7,690,205 B2 * | 4/2010 | Delaloye | F01D 19/00 |
| | | | 60/788 |
| 7,793,505 B2 * | 9/2010 | Dooley | F01D 19/00 |
| | | | 60/778 |
| 8,201,664 B2 * | 6/2012 | Brouillet | F01D 25/20 |
| | | | 184/6.24 |

(Continued)

FOREIGN PATENT DOCUMENTS

| | | |
|---|---|---|
| EP | 1067282 A2 | 1/2001 |
| GB | 2952466 A | 9/2021 |

OTHER PUBLICATIONS

Extended European Search Report for counterpart EP Application No. 24202275.4 dated Jul. 25, 2025.

*Primary Examiner* — Michael A Riegelman
(74) *Attorney, Agent, or Firm* — Bachman & LaPointe, P.C.

(57) ABSTRACT

An electronically driven lubrication system including an electric lubrication pump; at least one bearing for a gas turbine engine component; an oil cooler fluidly coupled with the electric lubrication pump; lubrication oil fluidly coupled with the electric lubrication pump, at least one bearing and oil cooler; at least one sensor in operative communication with the lubrication oil; a controller comprising a processor in operative communication with the at least one sensor, the electric lubrication pump, the at least one bearing and the oil cooler; and the processor configured to provide processor outputs to the electric lubrication pump responsive to data collected from the at least one sensor, wherein the processor employs an operational configuration for the electronically driven lubrication system.

6 Claims, 4 Drawing Sheets

(56) References Cited

U.S. PATENT DOCUMENTS

| | | | | |
|---|---|---|---|---|
| 8,887,869 | B2 * | 11/2014 | Pisseloup | F01D 25/20 |
| | | | | 184/6.11 |
| 11,162,419 | B2 * | 11/2021 | Nayani | F02C 7/06 |
| 11,719,128 | B2 * | 8/2023 | Gauthier | F02C 7/06 |
| | | | | 184/6.11 |
| 12,173,845 | B1 * | 12/2024 | Ganiger | F16N 29/00 |
| 2010/0012434 | A1 * | 1/2010 | Pisseloup | F01D 25/20 |
| | | | | 184/6.11 |
| 2013/0091859 | A1 * | 4/2013 | Osorio | F02C 7/32 |
| | | | | 137/1 |
| 2014/0255171 | A1 * | 9/2014 | Laigle | F01D 25/20 |
| | | | | 415/175 |
| 2017/0234158 | A1 * | 8/2017 | Savela | F01D 25/164 |
| | | | | 416/1 |
| 2017/0234236 | A1 * | 8/2017 | Feulner | F02C 7/18 |
| | | | | 60/778 |
| 2018/0283211 | A1 * | 10/2018 | Parnin | F01D 19/00 |
| 2018/0283283 | A1 * | 10/2018 | Manoukian | F02C 9/00 |
| 2019/0249602 | A1 * | 8/2019 | Nayani | F16N 39/02 |
| 2020/0256393 | A1 * | 8/2020 | Mashkin | F16N 7/38 |
| 2023/0243467 | A1 * | 8/2023 | Serghine | F01D 25/18 |
| | | | | 184/6.3 |
| 2025/0109709 | A1 * | 4/2025 | Chukrallah | F02C 7/14 |

* cited by examiner

ELECTRONICALLY DRIVEN LUBRICATION SYSTEM ON GAS TURBINE ENGINES

BACKGROUND

The present disclosure is directed to an electronically driven lubrication system for a gas turbine engine.

A gas turbine engine comprises a plurality of rotating elements, such as shafts, rotating at a very high rotation speed when the engine is running. These rotating elements are supported by bearings provided at various strategic locations in the engine. These bearings are lubricated using pressurized oil. Oil is sent to the bearing cavities using oil pumps that are mechanically driven and as a result will start to pump oil to the bearings as soon as the engine starter is engaged.

The mechanically driven pumps often operate at a much higher flow and pressure than what is required at different operating modes of the gas turbine engine resulting in additional parasitic drag. In addition mechanical pumps are dependent on engine operation.

SUMMARY

In accordance with the present disclosure, there is provided an electronically driven lubrication system comprising: an electric lubrication pump; at least one bearing for a gas turbine engine component; an oil cooler fluidly coupled with the electric lubrication pump; lubrication oil fluidly coupled with the electric lubrication pump, at least one bearing and oil cooler; at least one sensor in operative communication with the lubrication oil; a controller comprising a processor in operative communication with the at least one sensor, the electric lubrication pump, the at least one bearing and the oil cooler; and the processor configured to provide processor outputs to the electric lubrication pump responsive to data collected from the at least one sensor, wherein the processor employs an operational configuration for the electronically driven lubrication system.

A further embodiment of any of the foregoing embodiments may additionally and/or alternatively include the electronically driven lubrication system further comprising a tangible, non-transitory memory configured to communicate with said processor, the tangible, non-transitory memory having instructions stored therein that, in response to execution by the processor, cause the processor to perform operations comprising: receiving, by the processor, sensor data for determination of electronically driven lubrication system operational parameters; receiving, by the processor, sensor data for determination of gas turbine engine operational parameters; receiving, by the processor, sensor data for determination of aircraft operational parameters; configuring, by the processor, the operational configuration for the electronically driven lubrication system; adjusting, by the processor, the electric lubrication pump speed; and adjusting, by the processor, the lubrication oil flow path.

A further embodiment of any of the foregoing embodiments may additionally and/or alternatively include the electronically driven lubrication system operational parameters comprise one or more of oil pressure, oil temperature, pump speed, oil flow rate, motor temperature and the like.

A further embodiment of any of the foregoing embodiments may additionally and/or alternatively include the operational parameters of the engine and the aircraft comprise one or more of airframe conditions, such as ambient temperature and pressure, altitude, weight on the aircraft wheels, engine speed and engine operational mode.

A further embodiment of any of the foregoing embodiments may additionally and/or alternatively include gas turbine engine operational parameters comprise an engine operational mode defining an operational mode of the engine comprising start-up, shutdown, cooldown, pre-start, or cruise conditions and the like.

A further embodiment of any of the foregoing embodiments may additionally and/or alternatively include the operational configuration for the electronically driven lubrication system is selected from a group comprising a fast start standby mode, an oil cooler bypass mode, a variable run mode, a shutdown mode, and an oil cooling mode.

A further embodiment of any of the foregoing embodiments may additionally and/or alternatively include the at least one bearing for a gas turbine engine component is selected from the group consisting of a starter generator, a gearbox, an auxiliary power unit, and drive shaft bearings.

In accordance with the present disclosure, there is provided an electronically driven lubrication system comprising a computer readable storage device readable by the system, tangibly embodying a program having a set of instructions executable by the system to perform the following steps for operation of the electronically driven lubrication system, the set of instructions comprising: an instruction to receive sensor data for determination of gas turbine engine operational parameters; an instruction to receive sensor data for determination of electronically driven lubrication system operational parameters; an instruction to receive sensor data for determination of aircraft operational parameters; an instruction to determine an operational configuration for the electronically driven lubrication system; and an instruction to configure the operational configuration for the electronically driven lubrication system in at least one of a fast start standby mode, an oil cooler bypass mode, a variable run mode, a shutdown mode, and an oil cooling mode.

A further embodiment of any of the foregoing embodiments may additionally and/or alternatively include the fast start standby mode comprises: an instruction to fluidly couple an electric lubrication pump to bearings of gas turbine components; an instruction to verify operational status of an auxiliary power unit being off; an instruction to circulate lubrication oil throughout the electronically driven lubrication system via the electric lubrication pump; and an instruction to bypass an oil cooler configured in an oil cooler bypass mode.

A further embodiment of any of the foregoing embodiments may additionally and/or alternatively include the variable run mode comprises: an instruction to operate an electric lubrication pump through a continuous range of minimum and maximum bearing lubrication oil flow rates responsive to at least one of an aircraft operating condition and a gas turbine engine operating condition; wherein the operating conditions are selected from a group comprising an aircraft altitude, an aircraft attitude, and an engine load.

A further embodiment of any of the foregoing embodiments may additionally and/or alternatively include the shutdown mode comprises: an instruction to configure an electric lubrication pump to function as a deprime valve in order to shutdown or reduce flow of lubrication oil responsive to an auxiliary power unit winding down.

A further embodiment of any of the foregoing embodiments may additionally and/or alternatively include the oil cooling mode comprises: an instruction to operate the electric lubrication pump responsive to an auxiliary power unit shutdown on lubrication oil overtemperature condition; an instruction for the controller to initiate an auxiliary power unit bypass condition, wherein the auxiliary power unit bypass condition comprises: an instruction for the lubrication oil flow to bypass the auxiliary power unit and an instruction to fluidly couple lubrication oil between an oil cooler and the electric lubrication pump for cooling and auxiliary power unit restart.

A further embodiment of any of the foregoing embodiments may additionally and/or alternatively include the electronically driven lubrication system comprises: an electric lubrication pump; at least one bearing for a gas turbine engine component; an oil cooler fluidly coupled with the electric lubrication pump; lubrication oil fluidly coupled with the electric lubrication pump, the at least one bearing and the oil cooler; at least one sensor in operative communication with the lubrication oil; and a controller comprising a processor in operative communication with the at least one sensor, the electric lubrication pump, the at least one bearing and the oil cooler.

In accordance with the present disclosure, there is provided a process for configuring an electronically driven lubrication system comprising: an electric lubrication pump; at least one bearing for a gas turbine engine component; an oil cooler fluidly coupled with the electric lubrication pump; lubrication oil fluidly coupled with the electric lubrication pump, at least one bearing and oil cooler; at least one sensor in operative communication with the lubrication oil; a controller comprising a processor in operative communication with the at least one sensor, the electric lubrication pump, the at least one bearing and the oil cooler; determining at least one of gas turbine engine operational parameters, electronically driven lubrication system operational parameters, and aircraft operational parameters; determining an operational configuration for the electronically driven lubrication system; and employing the operational configuration for the electronically driven lubrication system in at least one of a fast start standby mode, an oil cooler bypass mode, a variable run mode, a shutdown mode, and an oil cooling mode.

A further embodiment of any of the foregoing embodiments may additionally and/or alternatively include the fast start standby mode comprises: fluidly coupling the electric lubrication pump to the at least one bearing for the gas turbine component; verifying that an auxiliary power unit is off; circulating the lubrication oil throughout the electronically driven lubrication system via the electric lubrication pump; and bypassing the oil cooler configured in an oil cooler bypass mode.

A further embodiment of any of the foregoing embodiments may additionally and/or alternatively include the variable run mode comprises: operating the electric lubrication pump through a continuous range of minimum and maximum bearing lubrication oil flow rates responsive to at least one of an aircraft operating condition and a gas turbine engine operating condition; wherein the operating conditions are selected from the group consisting of an aircraft altitude, an aircraft attitude, and an engine load.

A further embodiment of any of the foregoing embodiments may additionally and/or alternatively include the shutdown mode comprises: configuring the electric lubrication pump to function as a deprime valve in order to shutdown or reduce flow of lubrication oil responsive to an auxiliary power unit winding down.

A further embodiment of any of the foregoing embodiments may additionally and/or alternatively include the oil cooling mode comprises: operating the electric lubrication pump responsive to an auxiliary power unit shutdown based on a lubrication oil overtemperature condition; initiating an auxiliary power unit bypass condition, wherein the auxiliary power unit bypass condition comprises: bypassing the lubrication oil from the auxiliary power unit and fluidly coupling the lubrication oil between the oil cooler and the electric lubrication pump for cooling and auxiliary power unit restart.

A further embodiment of any of the foregoing embodiments may additionally and/or alternatively include the electronically driven lubrication system operational parameters are selected from a group comprising oil pressure, oil temperature, pump speed, oil flow rate, and electric motor temperature; and wherein the operational parameters of the engine and the aircraft are selected from a group comprising airframe conditions, such as ambient temperature and pressure, altitude, weight on the aircraft wheels, engine speed and engine operational mode.

A further embodiment of any of the foregoing embodiments may additionally and/or alternatively include the at least one bearing for a gas turbine engine component is selected from a group comprising a starter generator, a gearbox, an auxiliary power unit, and drive shaft bearings.

Other details of the electronically driven lubrication system are set forth in the following detailed description and the accompanying drawings wherein like reference numerals depict like elements.

DETAILED DESCRIPTION

Figure 1:
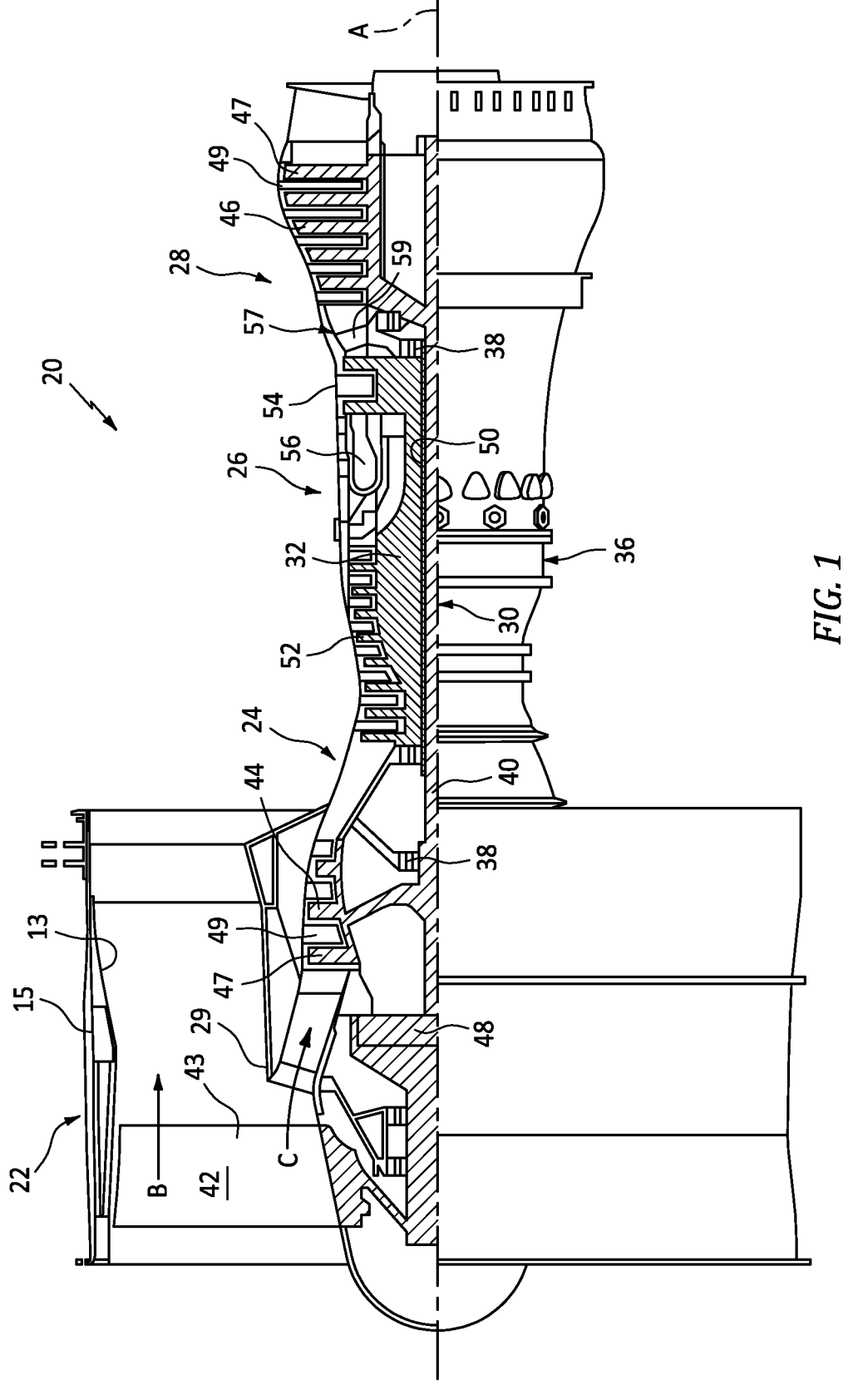
FIG. 1 is a cross section view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

Figure 2:
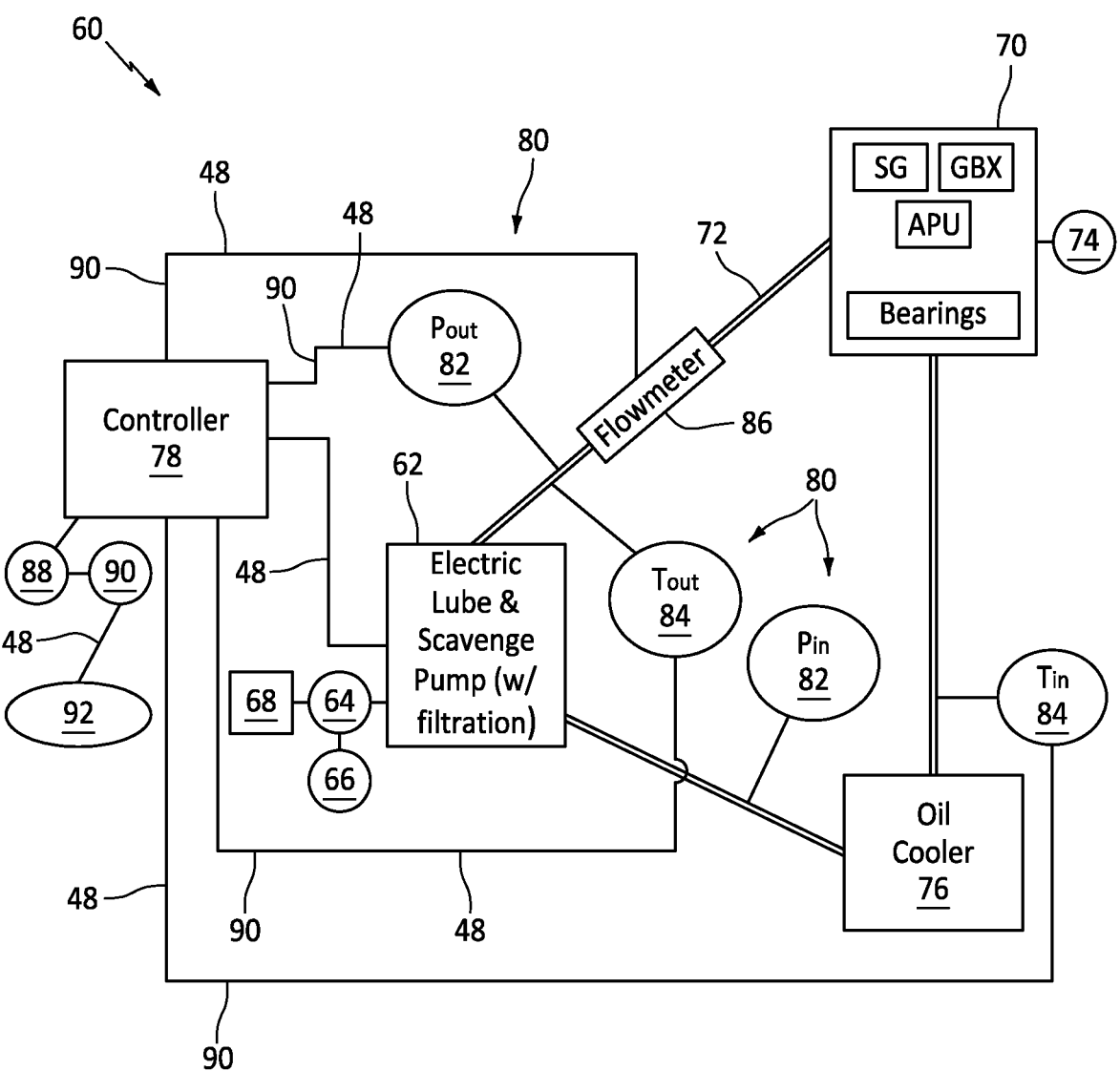
FIG. 2 is a schematic representation of an exemplary electronically driven lubrication system.

Referring also to FIG. 2, an electronically driven lubrication system 60 is shown. The electronically driven lubrication system 60 can include an electric lubrication pump 62. The electric lubrication pump 62 can include an electric motor 64 in operative communication with a lubrication pump 66. The electric motor 64 is the prime mover that powers the lubrication pump 66. The electric motor 64 is powered by electricity from an electric power source 68 such as gas turbine engine electrical generator, aircraft batteries, and the like. The electric motor 64 can be a constant speed motor or a variable speed motor.

The electric lubrication pump 62 is fluidly coupled to various gas turbine engine components 70 that require lubrication oil 72 being circulated by the electric lubrication pump 62. The gas turbine engine components 70 can include bearings 74 for a starter generator (SG), a gearbox (GBX), an auxiliary power unit (APU), and various shaft bearings and the like.

The electric lubrication pump 62 is fluidly coupled to oil cooler(s) 76. The oil cooler(s) 76 is configured to regulate the temperature of the lubrication oil 72 that circulates through the lubrication system 60.

The electronically driven lubrication system 60 includes a controller 78 in operative communication with the electric lubrication pump 62. The controller 78 can be in operative communication with instrumentation and control sensors 80. The sensors 80 can include pressure sensors 82, temperature sensors 84, flowmeter 86 and the like.

The controller 78 includes processor(s) 88. Processor data 90 may be transmitted to one or more processors 88 (e.g., computer systems having a central processing unit and memory) for recording, processing and storing the data 90 received from sensors 80. Processor 88 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof. Processor 88 may be in communication (such as electrical communication) with sensors 80 and may be configured to receive input, such as oil temperature, oil pressure, engine/APU status, pump speed, aircraft operational parameters and the like, from sensors 80. Processor 88 may receive data 90 about the lubrication system 60 captured and transmitted by the sensor(s) 80 and/or aircraft 92 via communication channel(s) 48. Upon receiving the data 90, the processor 88 may process data 90 from sensors 80 to determine operational conditions for the electronically driven lubrication system 60.

The operational parameters of the engine 20 and aircraft 92 can include but not be limited to airframe conditions, such as ambient temperature and pressure, altitude, weight on the aircraft wheels, engine speed, engine operational state/mode, such as start-up, shutdown, cooldown, pre-start, cruise conditions, flight parameters, such as location, distance to destination, and the like. Additionally, operational parameters of the electronically driven lubrication system 60 can include but not be limited to oil pressure, oil temperature, pump speed, oil flow rate, motor temperature and the like.

Figure 3:
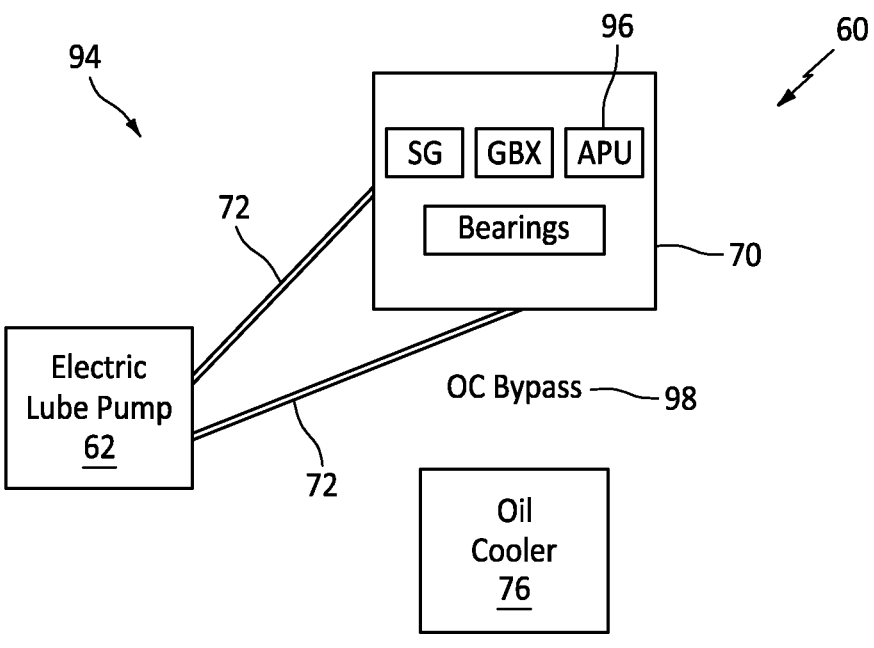
FIG. 3 is a schematic representation of an exemplary electronically driven lubrication system.

Referring also to FIG. 3, an exemplary operational configuration for the electronically driven lubrication system 60 is shown. The operational configuration can include a fast start standby mode 94. In the fast start standby mode 94, the electric lubrication pump 62 is fluidly coupled to the gas turbine components 70. The auxiliary power unit 96 is off. The electric lubrication pump 62 circulates lubrication oil 72 throughout the system 60. However, the oil cooler 76 is bypassed and in an oil cooler bypass mode 98. With the lubrication oil 72 in circulation while the oil cooler 76 is in a bypass mode 98, the flowing oil 72 warms up through pumping effects and thermal heat exchange within the electric motor 64. Active bypass of the oil cooler 76 can allow for quicker heating of the oil 72 and the entire system 60. The lubrication oil 72 can be monitored by the controller 78 via oil temperature sensor(s) 84 to maintain predetermined oil temperatures. The controller 78 can be configured to vary the flow rates of the lubrication oil 72 by utilizing a variable speed electric motor 64. In an exemplary embodiment, with a constant speed electric motor 64, the controller 78 can vary the flow of the lubrication oil 72 by pulsing power to the constant speed electric motor 64. The controller 78 can also continue the fast start standby mode 94 during engine ON for an extended heating period of time until the lubrication oil 72 has reached a predetermined temperature, at which time the oil cooler bypass mode 98 would end and the lubrication oil 72 would divert to the oil cooler 76 for temperature regulation.

Figure 4:
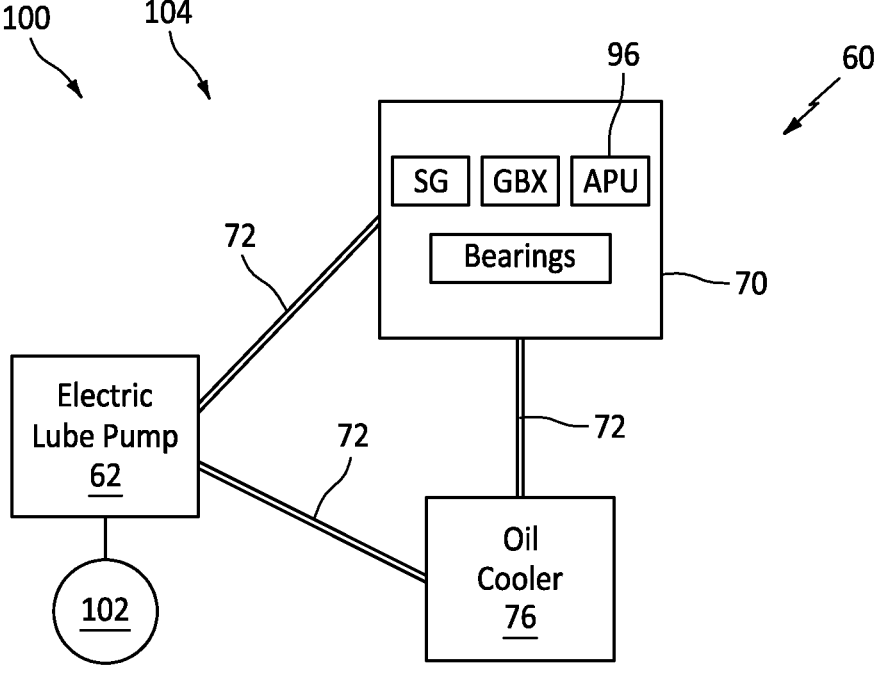
FIG. 4 is a schematic representation of an exemplary electronically driven lubrication system.

Referring also to FIG. 4, an exemplary operational configuration for the electronically driven lubrication system 60 is shown. The operational configuration can include a variable run mode 100. During the variable run mode 100 the electric lubrication pump 62 can be operated through a continuous range of minimum and maximum bearing 74 flow responsive to the aircraft 92 and gas turbine engine 20 operating conditions, such as altitude, attitude, load, and the like. In the variable run mode 100 the electric power consumption of the electric lubrication pump 62 can be optimized allowing for an increase overall electronically driven lubrication system 60 efficiencies. The electronically driven lubrication system 60 may be commanded by the electronic controller 78 such as a FADEC, to provide a specific flow rate at which the resultant electronically driven lubrication system 60 pressures at the engine bearings 74 are sufficient to support the engine loads required for a specific engine operating condition. This may be done through a preset schedule in the controller 78. In an exemplary embodiment, the electronically driven lubrication system 60 can include a dry sump system 102 fluidly coupled with the electric lubrication pump 62 to allow for operation throughout a wide range of aircraft attitudes.

The operational configuration can include a shutdown mode 104. In the shutdown mode 104 the electronically driven lubrication system 60 can function as a deprime valve in order to shutdown or reduce flow of the lubrication oil 72 as the APU 96 winds down. The deprime valve is active in initial ramp up to reduce system drag. The electronically driven lubrication system 60 can divert the lubrication oil 72 to the oil cooler 76. The electronically driven lubrication system 60 can also mimic the operation of an oil deprime valve typically used in oil systems to remove oil from the various oil passageways. Commanding the electric lube pump 62 to provide zero flow at specific times can provide similar functionality to potentially eliminate a need for the deprime valve.

Figure 5:
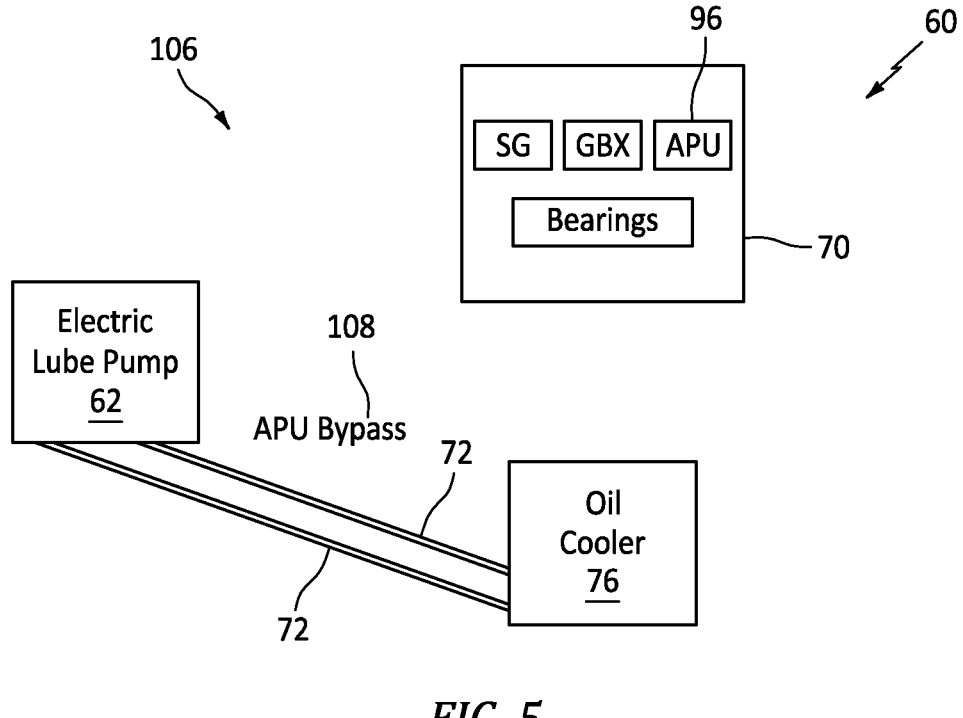
FIG. 5 is a schematic representation of an exemplary electronically driven lubrication system.

Referring also to FIG. 5, an exemplary operational configuration for the electronically driven lubrication system 60 is shown. The operational configuration can include an oil cooling mode 106. During the oil cooling mode 106 the electric lubrication pump 62 can be operated responsive to APU 96 shutdown on oil 72 overtemperature conditions. During the oil cooling mode 106 the controller 78 initiates an APU bypass condition 108. In the APU bypass condition 108, the lubrication oil 72 flow bypasses the APU 96 and fluidly couples the lubrication oil 72 between the oil cooler 76 and the electric lubrication pump 62 for quick cooling and APU restart. The APU bypass condition 108 can also be employed outside of an emergency mode.

A technical advantage of the disclosed electronically driven lubrication system can include an optimized flow required for different operating conditions minimizing parasitic loads on the engine.

Another technical advantage of the disclosed electronically driven lubrication system can include using an electric oil pump which would replace use of a deprime valve.

Another technical advantage of the disclosed electronically driven lubrication system can include using an electric oil pump to further accelerate a start transient.

Another technical advantage of the disclosed electronically driven lubrication system can include the potential reduction in overall weight of the lubrication system with elimination of a deprime valve and pressure regulating valves.

Another technical advantage of the disclosed electronically driven lubrication system can include more rapid starts in case of an emergency shutdown due to hot oil restarts.

Another technical advantage of the disclosed electronically driven lubrication system can include keeping oil warm in the gearbox (GBX) to reduce cold oil drag effects during altitude engine starts, allowing the engine to reach operational speed quicker.

There has been provided an electronically driven lubrication system. While the electronically driven lubrication system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An electronically driven lubrication system comprising:
an electric lubrication pump;
at least one bearing for a gas turbine engine component;
an oil cooler fluidly coupled with the electric lubrication pump;
lubrication oil fluidly coupled with the electric lubrication pump, at least one bearing and oil cooler;
at least one sensor in operative communication with the lubrication oil;
a controller comprising a processor in operative communication with the at least one sensor, the electric lubrication pump, the at least one bearing and the oil cooler; and
the processor configured to provide processor outputs to the electric lubrication pump responsive to data collected from the at least one sensor, wherein the processor employs an operational configuration for the electronically driven lubrication system;
a tangible, non-transitory memory configured to communicate with said processor, the tangible, non-transitory memory having instructions stored therein that, in response to execution by the processor, cause the processor to perform operations comprising:
receiving, by the processor, sensor data for determination of electronically driven lubrication system operational parameters;
receiving, by the processor, sensor data for determination of gas turbine engine operational parameters;
receiving, by the processor, sensor data for determination of aircraft operational parameters;
configuring, by the processor, the operational configuration for the electronically driven lubrication system;
adjusting, by the processor, the electric lubrication pump speed;
adjusting, by the processor, the lubrication oil flow path; and
configuring, by the processor, the electric lubrication pump to function as a deprime valve in order to shutdown or reduce flow of lubrication oil responsive to an auxiliary power unit winding down.

2. The electronically driven lubrication system according to claim 1, wherein the electronically driven lubrication system operational parameters comprise one or more of oil pressure, oil temperature, pump speed, oil flow rate, motor temperature and the like.

3. The electronically driven lubrication system according to claim 1, wherein the operational parameters of the engine and the aircraft comprise one or more of airframe conditions, such as ambient temperature and pressure, altitude, weight on the aircraft wheels, engine speed and engine operational mode.

4. The electronically driven lubrication system according to claim 3, wherein gas turbine engine operational parameters comprise an engine operational mode defining an operational mode of the engine comprising start-up, shutdown, cooldown, pre-start, or cruise conditions and the like.

5. The electronically driven lubrication system according to claim 1, wherein the operational configuration for the electronically driven lubrication system is selected from a group comprising a fast start standby mode, an oil cooler bypass mode, a variable run mode, a shutdown mode, and an oil cooling mode.

6. The electronically driven lubrication system according to claim 1, wherein the at least one bearing for a gas turbine engine component is selected from the group consisting of a starter generator, a gearbox, an auxiliary power unit, and drive shaft bearings.

* * * * *